J. F. CANNON.
ANIMAL POKE.
APPLICATION FILED MAY 5, 1908.

907,314.  Patented Dec. 22, 1908.

Witnesses

Inventor
J. F. Cannon
By R. A. O. Lacey, Attorney

UNITED STATES PATENT OFFICE.

JOHN F. CANNON, OF TEXOLA, OKLAHOMA.

ANIMAL-POKE.

No. 907,314.　　　Specification of Letters Patent.　　　Patented Dec. 22, 1908.

Application filed May 5, 1908. Serial No. 431,015.

*To all whom it may concern:*

Be it known that I, JOHN F. CANNON, citizen of the United States, residing at Texola, in the county of Beckham and State of Oklahoma, have invented certain new and useful Improvements in Animal-Pokes, of which the following is a specification.

The present invention has for its object to provide an improved animal-poke, which is light, simple in construction, durable in use, and comparatively inexpensive of production, and it relates more particularly to that class wherein spurs or other pricking instruments are entirely dispensed with, the means employed being such as will produce a choking sensation upon the throat of the animal without the attendance of any danger resulting from the use of such spurs.

Another object is to provide a poke that may be readily applied to the neck of an animal without slipping the same over its head.

Another object is to provide a poke having a guard member that is suspended from the animal's neck in front of his breast which will not interfere with the animal when feeding or in a recumbent position.

The invention further consists of the novel features and details of construction which hereinafter will be set forth, illustrated and claimed.

Figure 1:
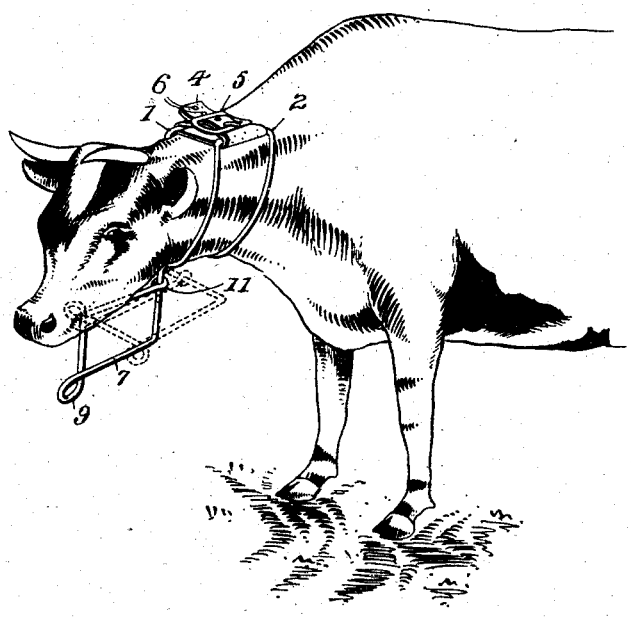
Figure 2:
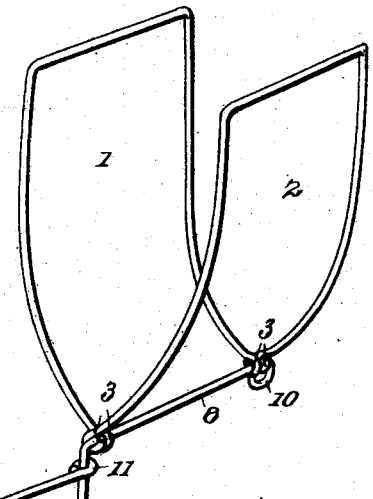

Referring to the drawings forming a part of the specification:—Figure 1 is a perspective view showing the device as applied, the guard member shown in dotted lines being swung to one side. Fig. 2 is a perspective view of the device.

In carrying out my invention, I provide a collar comprising a pair of similar members 1 and 2, each member being formed of an approximately U-shaped frame, the members of which terminate in eyes 3, which are adapted to receive a rod 8 by means of which they are pivotally connected. The members curve throughout their length to conform to the sides of the neck of the animal to which they are adapted to be applied. The frames are preferably pivotally united at their lower ends and are suitably connected at their upper ends, preferably by a strap 4 which is adapted to have a buckle 5 applied to one end designed to engage openings 6 in the opposite end of said strap, permitting adjustment of the frames. The strap is almost as wide as the frames to prevent its back and forth movement.

The guard consists of a rectangular frame provided at its upper and lower front corners with projecting loops 9 which are intended to engage with the wire of a fence, thereby preventing the animal from passing over, through, or beneath the fence-wires.

Extending rearwardly from the upper rear corner of the guard is a rod 8 which forms the pivot connecting means for the members 1 and 2 of the collar, said rod terminating in an eye 10 which encircles the rear eyes 3 and prevents outward displacement of the guard. The upper bar of the guard has a limited play, its rear end being looped about the vertical bar at the rear end of the frame as shown at 11. The poke is composed of stout wire or light bar metal.

From the foregoing it will be understood that I have devised an animal poke which is highly efficient and free from devices such as spurs that are liable to produce injury, and which will not interfere with the animal's grazing, or feeding, or cause any unnecessary fretting or discomfort.

Having thus described the invention, what is claimed as new is:

1. In an animal-poke, comprising a guard, a collar formed of similar side members pivotally connected at their lower ends to the guard, and means adjustably connecting the upper ends of the members.

2. In an animal-poke, comprising a guard, a collar formed of similar side members pivotally connected at their lower ends to the guard, said members curving outwardly between their upper and lower ends, and means adjustably connecting the upper ends of said members.

3. In an animal-poke, comprising a guard, similar frames approximately of U-form having eyes at the lower ends of their members, and which eyes receive a portion of the guard which pivotally connects them, said frames curving in their length, and means securing the frames together at their upper ends.

4. In an animal-poke, the combination of a collar comprising similar frames having eyes at their lower ends, means for connecting the upper ends of the frames, and a guard having a rearwardly extended rod passed through the eyes of the frames and pivotally connecting the latter.

5. In an animal-poke, the combination of a collar comprising similar frames having eyes at their lower ends, means for connecting the upper ends of the frames together, and a guard pivotally connecting the frames and of rectangular form and provided at its upper and lower front corners with loop-shaped projections.

In testimony whereof I affix my signature in presence of two witnesses.

JOHN F. CANNON. [L. S.]

Witnesses:
G. T. BURROWS,
C. E. GILILLAND.